(12) United States Patent
Eom et al.

(10) Patent No.: US 10,956,028 B2
(45) Date of Patent: *Mar. 23, 2021

(54) PORTABLE DEVICE AND METHOD FOR PROVIDING USER INTERFACE MODE THEREOF

(71) Applicant: Samsung Electronics Co., Ltd., Gyeonggi-do (KR)

(72) Inventors: Ju-il Eom, Gyeonggi-do (KR); Kuk-hyun Han, Daejeon (KR); Yong-gook Park, Gyeonggi-do (KR); Ji-su Jung, Chungcheongbuk-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 15/973,030

(22) Filed: May 7, 2018

(65) Prior Publication Data

US 2018/0253227 A1 Sep. 6, 2018

Related U.S. Application Data

(63) Continuation of application No. 13/242,697, filed on Sep. 23, 2011, now Pat. No. 9,965,168.

(30) Foreign Application Priority Data

Nov. 29, 2010 (KR) .................. 10-2010-0120025

(51) Int. Cl.
*G06F 3/0488* (2013.01)
*G06F 3/0482* (2013.01)
(Continued)

(52) U.S. Cl.
CPC .......... *G06F 3/04883* (2013.01); *G06F 3/017* (2013.01); *G06F 3/0481* (2013.01);
(Continued)

(58) Field of Classification Search
CPC .... G06F 3/04812; G06F 3/0482; G06F 3/017; G06F 3/04883; G06F 3/0483; G06F 1/1624; G06F 3/04886
See application file for complete search history.

(56) References Cited

U.S. PATENT DOCUMENTS

| 6,704,032 B1 | 3/2004 | Falcon |
| 7,653,883 B2 | 1/2010 | Hotelling et al. |

(Continued)

FOREIGN PATENT DOCUMENTS

| EP | 1 991 832 | 11/2008 |
| JP | 2008140064 | 6/2008 |

(Continued)

OTHER PUBLICATIONS

Korean Office Action dated Jun. 29, 2016 issued in counterpart application No. 10-2010-0120025, 8 pages.

(Continued)

*Primary Examiner* — Steven P Sax
(74) *Attorney, Agent, or Firm* — The Farrell Law Firm, P.C.

(57) ABSTRACT

A portable device and a method for providing a User Interface (UI) mode are provided. The portable device includes a display unit, a sensor unit for sensing a user's motion, and a control unit for controlling, if the user's motion is sensed by the sensor unit, the display unit to release a standby mode of the portable device and to output a UI mode screen corresponding to a type of the motion.

18 Claims, 10 Drawing Sheets

(51) Int. Cl.
*G06F 3/01* (2006.01)
*G06F 3/0481* (2013.01)
*G06F 3/0483* (2013.01)

(52) U.S. Cl.
CPC .......... *G06F 3/0482* (2013.01); *G06F 3/0483* (2013.01); *G06F 3/04886* (2013.01); *G06F 2203/04808* (2013.01)

(56) References Cited

U.S. PATENT DOCUMENTS

| | | | |
|---|---|---|---|
| 8,125,312 B2 | 2/2012 | Orr | |
| 8,363,008 B2 | 1/2013 | Ryu et al. | |
| 8,375,315 B2 * | 2/2013 | Park | G06Q 10/109 |
| | | | 715/764 |
| 8,560,020 B2 | 10/2013 | Lee | |
| 9,600,139 B2 | 3/2017 | Kim | |
| 9,965,168 B2 * | 5/2018 | Eom | G06F 3/0481 |
| 2001/0015718 A1 | 8/2001 | Hinckley et al. | |
| 2002/0175896 A1 | 11/2002 | Vaananen et al. | |
| 2004/0056870 A1 | 3/2004 | Shimoyama et al. | |
| 2005/0068337 A1 * | 3/2005 | Duarte | G06F 1/1624 |
| | | | 345/649 |
| 2005/0091574 A1 | 4/2005 | Maaniitty | |
| 2005/0237310 A1 | 10/2005 | Fabritius | |
| 2006/0101338 A1 | 5/2006 | Kates | |
| 2006/0101354 A1 | 5/2006 | Hashimoto et al. | |
| 2007/0057912 A1 * | 3/2007 | Romriell | G06F 3/017 |
| | | | 345/156 |
| 2007/0113111 A1 | 5/2007 | Dahan et al. | |
| 2007/0145132 A1 | 6/2007 | Minemura | |
| 2007/0259717 A1 | 11/2007 | Mattice et al. | |
| 2007/0287541 A1 * | 12/2007 | George | G06F 3/041 |
| | | | 463/37 |
| 2008/0165022 A1 | 7/2008 | Herz et al. | |
| 2008/0170042 A1 | 7/2008 | Yoon et al. | |
| 2009/0064055 A1 | 3/2009 | Chaudhri et al. | |
| 2009/0138194 A1 | 5/2009 | Geelen | |
| 2009/0184933 A1 | 7/2009 | Wei-Wen | |
| 2009/0244019 A1 * | 10/2009 | Choi | G06F 3/0482 |
| | | | 345/173 |
| 2009/0322691 A1 | 12/2009 | Chiu | |
| 2010/0007613 A1 | 1/2010 | Costa | |
| 2010/0020035 A1 | 1/2010 | Ryu et al. | |
| 2010/0123664 A1 | 5/2010 | Shin et al. | |
| 2010/0138037 A1 | 6/2010 | Adelberg | |
| 2010/0162109 A1 * | 6/2010 | Chatterjee | G06F 3/04886 |
| | | | 715/702 |
| 2010/0229125 A1 | 9/2010 | Cha | |
| 2010/0235732 A1 | 9/2010 | Bergman | |
| 2010/0251152 A1 * | 9/2010 | Cho | G06F 3/0482 |
| | | | 715/765 |
| 2010/0261505 A1 * | 10/2010 | Yeh | G06F 3/04883 |
| | | | 455/564 |
| 2010/0299635 A1 | 11/2010 | Oh | |
| 2010/0306702 A1 | 12/2010 | Warner | |
| 2011/0003621 A1 | 1/2011 | Atsumi | |
| 2011/0043826 A1 | 2/2011 | Kiyose | |
| 2011/0053641 A1 | 3/2011 | Lee et al. | |
| 2011/0099524 A1 * | 4/2011 | Jeong | G06F 3/0486 |
| | | | 715/843 |
| 2011/0102345 A1 * | 5/2011 | Kim | G06F 3/044 |
| | | | 345/173 |
| 2011/0102464 A1 | 5/2011 | Godavari | |
| 2011/0124369 A1 | 5/2011 | Yamamoto | |
| 2011/0256019 A1 | 10/2011 | Gruen | |
| 2011/0316679 A1 | 12/2011 | Pihlaja | |

FOREIGN PATENT DOCUMENTS

| | | |
|---|---|---|
| KR | 1020020083961 | 11/2002 |
| KR | 1020080049911 | 6/2008 |
| KR | 1020080067885 | 7/2008 |
| KR | 1020090005796 | 1/2009 |
| KR | 1020090100320 | 9/2009 |
| KR | 1020100001601 | 1/2010 |
| KR | 1020100010860 | 2/2010 |
| KR | 1020100013420 | 2/2010 |
| KR | 1020100052378 | 5/2010 |
| KR | 1020100054290 | 5/2010 |

OTHER PUBLICATIONS

Korean Office Action dated Dec. 27, 2016 issued in counterpart application No. 10-2010-0120025, 9 pages.
Korean Office Action dated Sep. 4, 2017 issued in counterpart application No. 10-2010-0120025, 9 pages.

* cited by examiner

PORTABLE DEVICE AND METHOD FOR PROVIDING USER INTERFACE MODE THEREOF

PRIORITY

This application is a Continuation of application Ser. No. 13/242,697 filed in the U.S. Patent and Trademark Office on Sep. 23, 2011, and claims priority under 35 U.S.C. § 119(a) to Application No. 10-2010-0120025, filed on Nov. 29, 2010, in the Korean Intellectual Property Office, the entire content of each of which is incorporated herein by reference.

BACKGROUND OF THE INVENTION

1. Field of the Invention

The present invention relates generally to a User Interface (UI) mode, and more particularly to a portable device and a method for providing a UI mode.

2. Description of the Related Art

Due to recent developments in technology, various portable devices, such as smart phones, cellular phones, Portable Media Players (PMPs), etc., receive input of user commands through a touch screen.

A capacitive touch screens have been primarily used for this purpose, which detects a touch point such that a charge field is spread over the surface of the touch screen, and if a user's finger, which is a kind of conductor, touches the charge field, the touch screen senses the charge passing through the user's finger.

However, if a non-conductive object touches the capacitive screen, such a touch is not recognized. Particularly, in a cold weather (such in a cold countries including Russia, or in a ski area, for example), the touch screen may be commonly operated by a gloved hand, and the capacitive touch screen is unable to recognize such a gloved hand that is not a conductor. Accordingly, despite the cold weather, a user must pull off the gloves in order to operate the capacitive touch, which is inconvenient for the user.

In addition, in other cases where may be difficult to operate the touch screen with a general touch operation, such as in the case where the hand is stained with foreign substances, in the case of driving a car, and in the case of taking a shower, it is necessary to operate the portable device without touching the touch screen.

Accordingly, there is a need for methods for operating the portable device through reception of an input of another user's motion other than touch input.

SUMMARY OF THE INVENTION

The present invention has been made to address at least the above problems and/or disadvantages and to provide at least the advantages described below. Accordingly, an aspect of the present invention provides portable device and a method of providing a UI thereof, which can release a standby mode and output a UI mode screen that corresponds to the type of a motion if the motion is sensed by a sensor unit.

According to one aspect of the present invention, a portable device is provided. The portable device comprises a display unit; a sensor unit for sensing a user's motion; and a processor configured to control, if the user's motion is sensed by the sensor unit, the display unit to release a standby mode of the portable device and output a User Interface (UI) mode screen corresponding to a type of the sensed motion.

According to another aspect of the present invention, a method is provided for providing a User Interface (UI) mode in a portable device by determining whether a user's motion is sensed; releasing, if the user's motion is sensed, a standby mode of the portable device; and outputting a UI mode screen corresponding to a type of the sensed motion.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
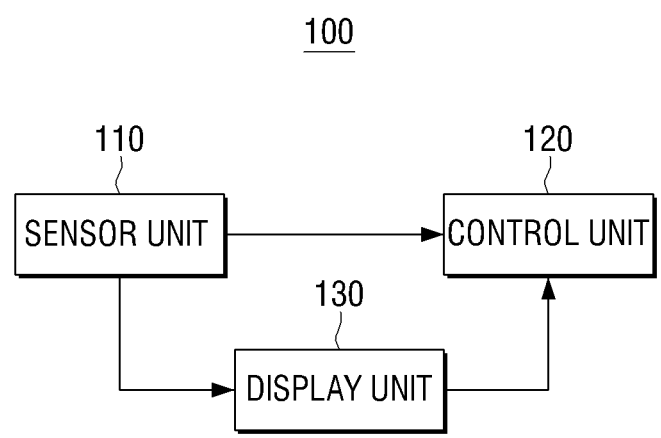
FIG. 1 is a schematic block diagram illustrating the configuration of a portable device according to an embodiment of the present invention.

Hereinafter, embodiments of the present invention are described in detail with reference to the accompanying drawings. It should be noted that throughout the drawings, the same drawing reference numerals will be construed to refer to the same elements, features and structures. In addition, descriptions of well-known functions and constructions may be omitted for clarity and conciseness.

FIG. 1 is a schematic block diagram illustrating the configuration of a portable device according to an embodiment of the present invention.

Referring to FIG. 1, a portable device 100 includes a sensor unit 110, a display unit 120, and a control unit 13. The portable device 100 may be a device that can perform a touch input through a touch screen, such as a smart phone, a cellular phone, a PMP, a tablet Personal Computer (PC), an Motion Picture experts' group audio layer-3 (MP3) device, etc.

The sensor unit 110 senses a user's motion to input a specified command to the portable device 100. In this case, the sensor unit 110 includes at least one of a touch screen for sensing a touch input, a proximity sensor for sensing a proximity input, an acceleration sensor for sensing an acceleration change of the portable device 100, and a gyro sensor for sensing rotation of the portable device 100.

Specifically, the touch screen senses the touch input that is made by a user's direct touch of the screen with a user's finger. In present example, the touch screen may be a capacitive touch screen, but, others types touch screen such as a resistive touch screen may also be used in accordance with embodiments of the present invention. The portable device 100 can sense the touch input through a general touch screen operation.

The proximity sensor senses the proximity input generated by a user's movement over the screen in a state where a user's finger or an object is spaced apart from the screen. Specifically, if the object or the user's finger moves over the proximity sensor while being spaced apart for a specified range, such as 1 to 3 cm, from the screen, the proximity sensor senses the proximity input.

Figure 2:
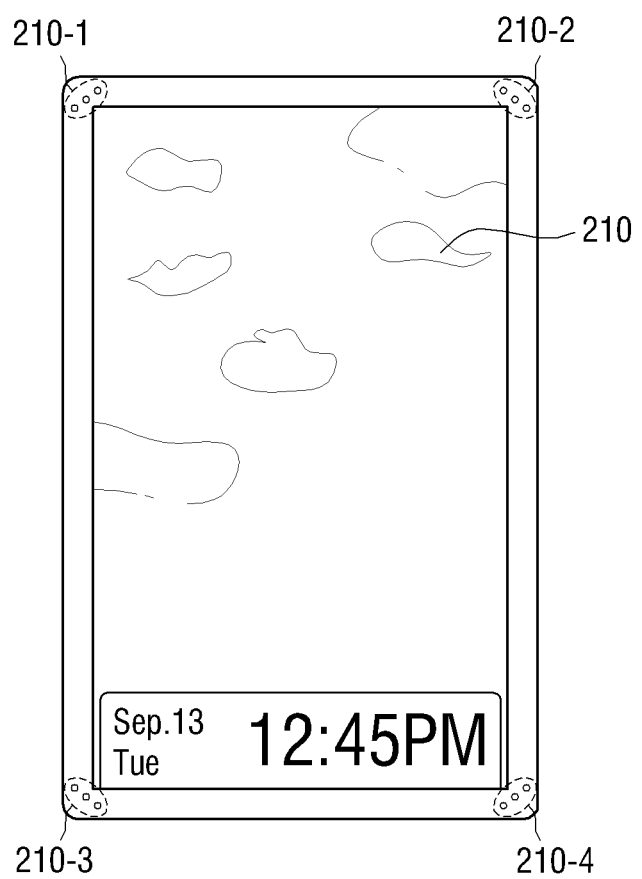
FIG. 2 is a diagram illustrating a portable device explaining a proximity sensor according to an embodiment of the present invention.

An Infra-Red (IR) sensor may be used as the proximity sensor. Particularly, as illustrated in FIG. 2, IR sensors 210-1, 210-2, 210-3, and 210-4 may be provided at each corner of one surface of the portable device 100. Accordingly, the portable device 100 can sense the direction of the user's proximity input. For example, if the object moves from the IR sensor 210-1 that is provided at the left upper end to the direction of the IR sensor 210-2 that is provided at the right upper end, the portable device 100 recognizes that the proximity input in the right direction is sensed.

Further, three IR sensors may be provided at each corner in a manner that two of the three IR sensors emit an IR signal and one remaining IR sensor receives the reflected IR signal. Accordingly, the IR sensors can sense whether the object has moved over the sensors.

The above-described types of proximity sensors are merely provided as examples, and different types of proximity sensors such as a Radio Frequency (RF) sensor may also be used in accordance with embodiments of the present invention. Similarly, the above-described positions of the proximity sensors are merely provided as examples, and proximity sensors may be positioned other position, such as at the center point of each side of the portable device 100. Further, the number of areas in which the above-described proximity sensors are positioned, as well as the number of proximity sensors themselves, are merely provided as examples, and the proximity sensors may alternatively be provided in five or more areas, for example, in accordance with embodiments of the present invention.

The acceleration sensor senses the change of acceleration of the portable device 100. Specifically, the acceleration sensor senses the direction of the acceleration input by sensing the acceleration change that occurs when a user shakes or hits the portable device 100. For example, if the user shakes the portable device 100 in the leftward direction or hits the left side surface of the portable device 100, the acceleration sensor senses the increase of the acceleration in the left direction. Accordingly, the portable device 100 can recognize that the acceleration input in the left direction has been sensed.

Further, the gyro sensor senses the rotation of the portable device 100. Specifically, the gyro sensor senses the rotation that occurs when the user shakes or hits the portable device 100. At this time, the rotation direction includes at least one of pitch, roll, and yaw directions of the portable device. For example, if the user shakes the portable device 100 so that the left side surface of the portable device 100 is moved downward, the gyro sensor senses that the portable device 100 is moved in the counterclockwise direction based on the roll direction of the portable device 100. Accordingly, the portable device 100 can recognize that the rotation input in the left direction has been sensed.

As described above, the sensor unit 110 receives an input of the user's motion through diverse sensors. However, the sensor unit 110 is not limited to the above-described examples, and the user's motion may be sensed by another sensor such as a geomagnetic sensor in accordance with embodiments of the present invention.

The display unit 120 displays various kinds of mode screens under the control of the control unit 130. For example, the display unit 120 can display a standby mode screen that corresponds to a state where the user does not use the portable device. Further, in accordance with the type of motion input by the user, the display unit 120 can display one of a touch UI mode that operates according to the touch input, a proximity UI mode that is operated by the proximity input, an acceleration UI mode that operates according to the acceleration input, and a rotation UI mode that operates according to the rotation input.

The control unit 130 controls functions of the portable device 100 in accordance with the user's motion input by the sensor unit 110.

Specifically, if a specified user's motion is sensed by the sensor unit 110, the control unit 130 controls the display unit 120 to release the standby mode of the portable device 100 and to output a UI mode screen that corresponds to the type of the user's motion. In this case, the control unit 130 provides at least one mode selected from among the touch UI mode, the proximity UI mode, the acceleration UI mode, and the rotation UI mode in accordance with the type of the motion input by the user.

Hereinafter, with reference to FIGS. 3A to 5, a method of providing a UI mode according to the type of motion input by the user is described.

Figure 3A:
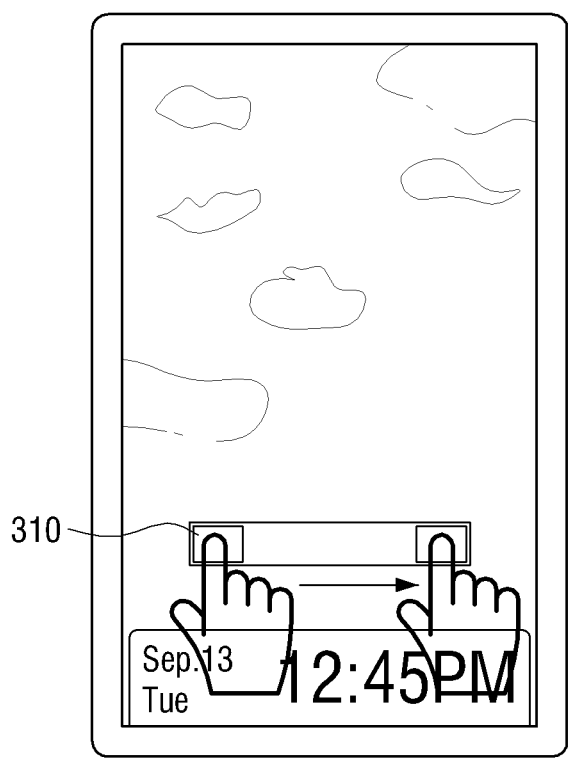
FIGS. 3A and 3B are diagrams illustrating a touch User Interface (UI) mode in accordance with a touch input according to an embodiment of the present invention.
Figure 3B:
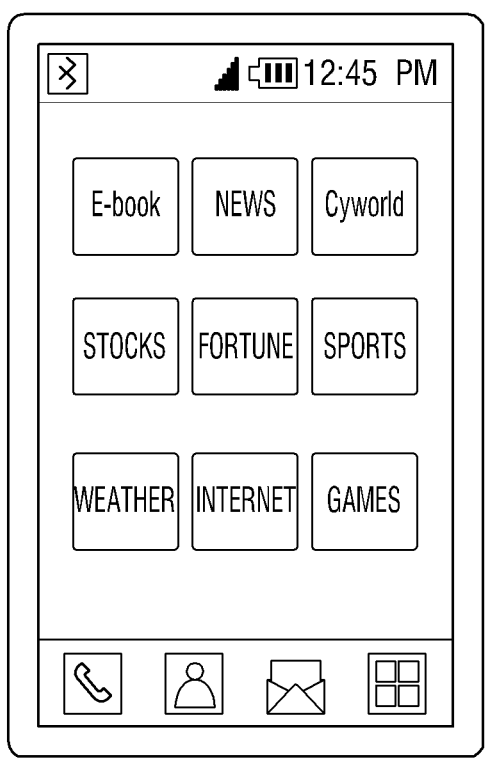

FIGS. 3A and 3B are diagrams illustrating a touch UI mode in accordance with a touch input according to an embodiment of the present invention. Generally, if the user does not use the portable device 100, the screen of the portable device 100 is in an off state. If a specified button that is provided on the outside of the portable device 100 is pressed, the portable device 100 provides a standby mode screen. In this case, the "standby mode screen" refers to a screen on which a menu for executing a specified application is not displayed, but only simple information such as date and time is displayed.

In the standby mode screen state, an icon 310 is displayed on the touch screen of the portable device as illustrated in FIG. 3A. In this case, if the user touches and moves the icon 310 to a specified area, the control unit 130 releases the standby mode of the portable device 100 and provides a touch UI mode. Further, the control unit 130 controls the display unit 120 to convert the standby mode screen into the touch UI mode screen and to display the touch UI mode screen as illustrated in FIG. 3B.

Herein, the term "touch UI mode" refers to a mode for performing the function of the portable device 100 through the sensing of the user's touch input through the touch screen. Accordingly, the control unit 130 controls the portable device 100 using the touch input sensed by the touch screen. The touch UI mode screen provides general functions of the portable device 100 as well as diverse application menus. For example, as illustrated in FIG. 2B, the touch UI mode screen provides menus for providing the basic functions of the portable device 100 (e.g., a phone menu, a photo menu, a text menu, etc.), as well as menus for providing application functions such as an E-book application, a news application, a stock application, a game application, and an Internet application.

As described above, the standby mode can be released by moving the icon 310 to a specified area. However, the standby mode can also be released by other methods in accordance with embodiments of the present invention. For example, the standby mode can be released by another method using the touch screen such as inputting of a password through the touch screen.

Figure 4A:
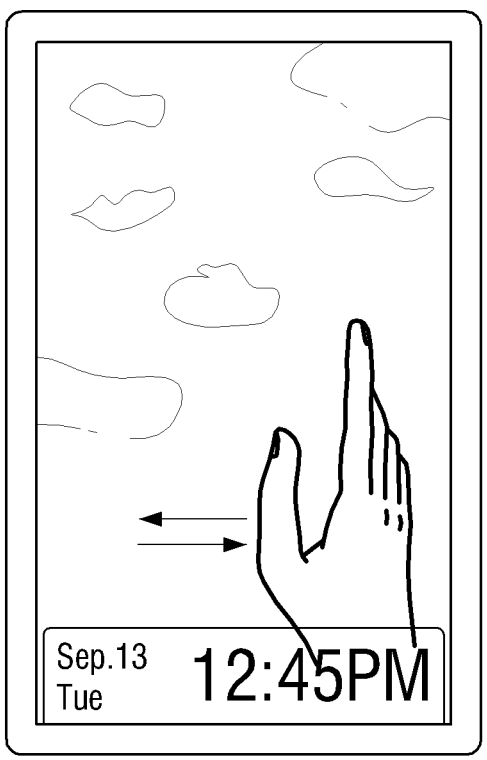
FIGS. 4A to 4D are diagrams illustrating a proximity UI mode in accordance with a proximity input according to an embodiment of the present invention.
Figure 4B:
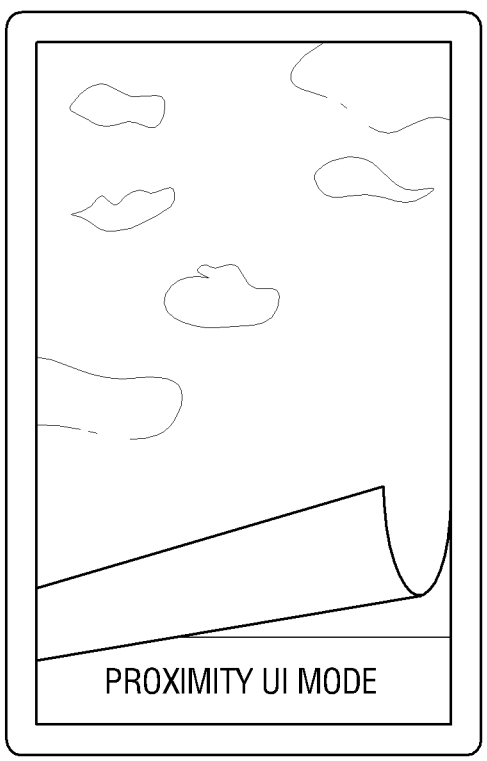

FIGS. 4A and 4B are diagrams illustrating a proximity UI mode in accordance with a proximity input according to an embodiment of the present invention.

Figure 4C:
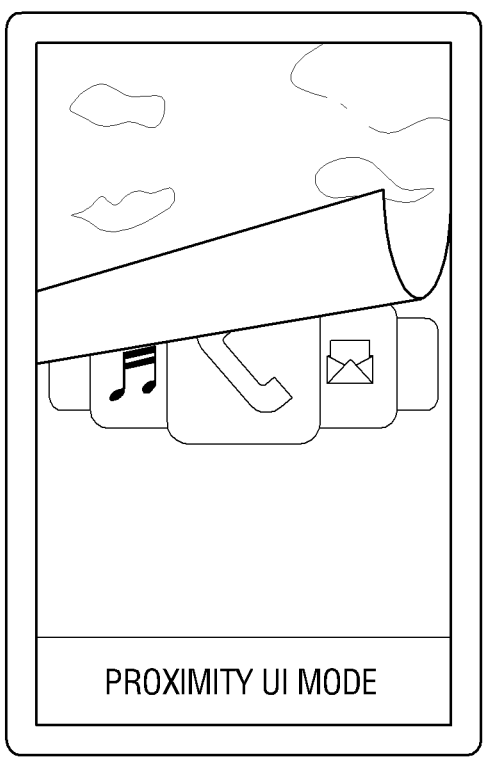
Figure 4D:
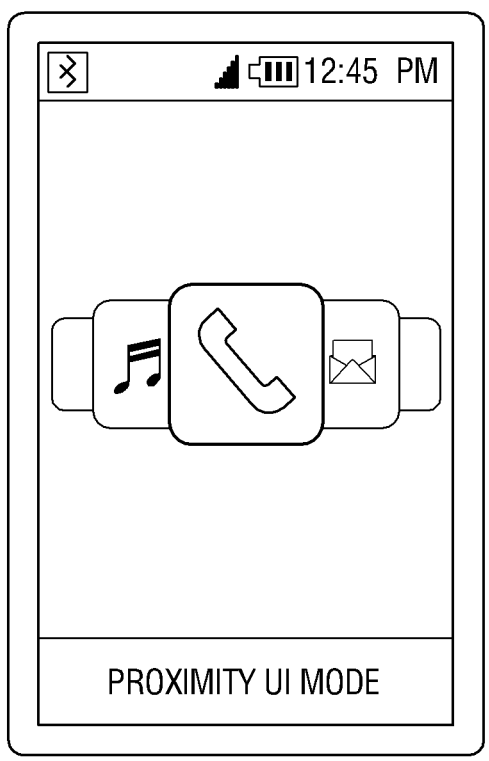

In the standby mode state as described above with reference to FIG. 3A, the user performs the proximity input while being spaced 1 to 3 cm from the touch screen. More specifically, as illustrated in FIG. 4A, if a user's hand makes one round trip from left to right and back to left (or vice versa) while being spaced apart from the touch screen, the control unit 130 senses the user's proximity input through the proximity sensor, and as illustrated in FIG. 3B, controls the display unit 120 to display a screen to which an effect of removing the standby mode screen upward is applied. Then, if the user's hand makes another round trip in the left and right directions, the control unit 130 controls the display unit 120 to display a screen to which an effect of removing the standby mode screen as illustrated in FIG. 4B further upward is applied as illustrated in FIG. 4C. That is, FIG. 4C illustrates output provided on the display unit 120 based on the another round trip in the left and right directions. Then, if the user's hand makes still another round trip in the left and right directions, the control unit 130 controls the display unit 120 to display the proximity UI mode screen as illustrated in FIG. 4D. That is, FIG. 4D illustrates display provided on the display unit 120 of the proximity UI mode screen based on the user making still another round trip in the left and right directions.

In this case, the control unit 130 provides the proximity UI mode screen only when continuous proximity input (i.e., the left/right round trip) has been performed three times. Specifically, if the proximity input in the left and right directions is not sensed within a specified time (for example, 2 seconds) after a first proximity input in the left and right directions is made, the control unit 130 provides the display screen in the previous step. For example, if the proximity input in the left and right directions is not sensed within two seconds in a state where the two times proximity input in the left and right directions are sensed and the screen as illustrated in FIG. 4C is displayed on the screen, the control unit 130 controls the display unit 120 to converts the screen as illustrated in FIG. 4C into the screen as illustrated in FIG. 4B. Further, the control unit 130 releases the standby mode and provides the proximity UI mode only when the proximity input in the left and right directions is performed twice in a state where the screen as illustrated in FIG. 4B is displayed on the screen.

As described above, through the three continuous proximity inputs in the left and right directions, the control unit 130 releases the standby mode and provides the proximity UI mode.

Herein, the term "proximity UI mode" refers to a mode in which the proximity input according to the user's movement, which is spaced apart from the touch screen, is sensed and the function of the portable device 100 is performed. Accordingly, the control unit 130 controls the portable device 100 using the proximity input sensed by the proximity sensor. Hereinafter, with reference to FIG. 5, the proximity input according to the user's action and a method of controlling the portable device 100 accordingly is described.

Figure 5:
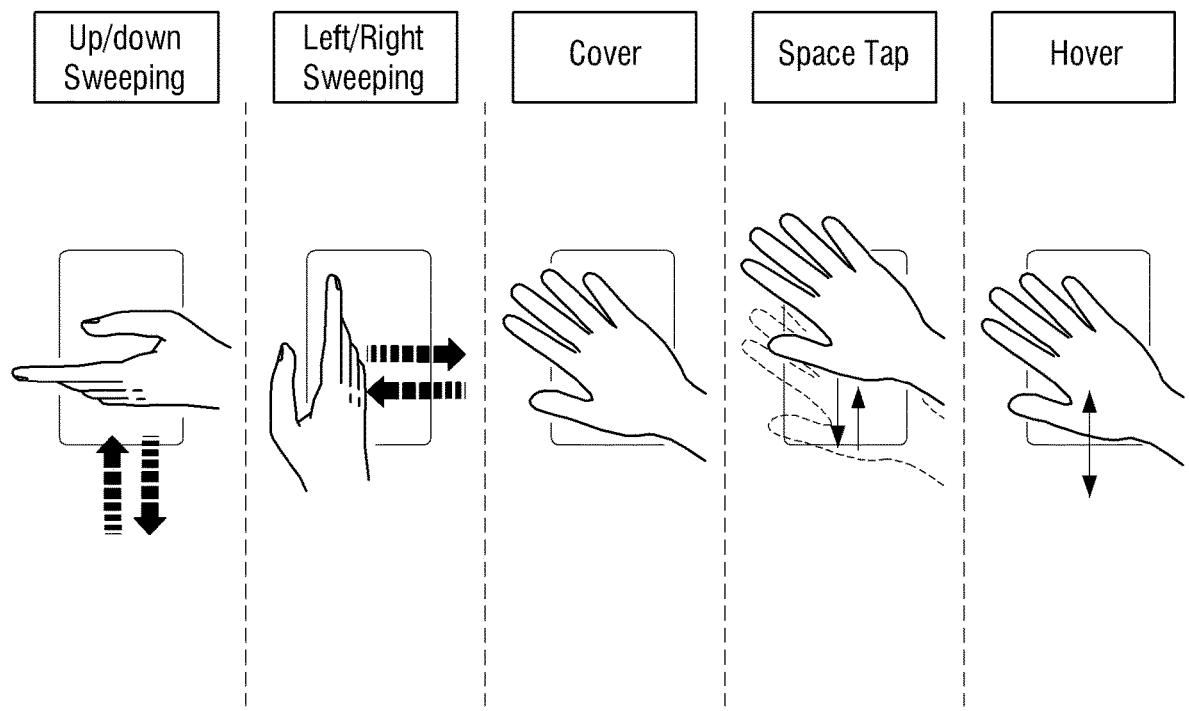
FIG. 5 is a diagram illustrating a proximity input method according to an embodiment of the present invention.

As illustrated first on the left side of FIG. 5, "up/down sweeping" refers to the movement of the user's hand in the upward and downward directions relative to the touch screen. Specifically, the "up sweeping" refers to the movement of the user's hand from the lower surface of the touch screen to the upper surface thereof. If the up sweeping action is input, the control unit 130 performs an action such as an action corresponding to a "▲" button for converting the menu display in the upward direction. The "down sweeping" refers to the movement of the user's hand from the upper surface of the touch screen to the lower surface thereof. If the down sweeping action is input, the control unit 130 performs an action such as an action corresponding to a "▼" button for converting the menu display in the downward direction.

As illustrated second in FIG. 5, "left/right sweeping" refers to the movement of the user's hand in the left and right directions relative to the touch screen. Specifically, the "left sweeping" refers to the movement of the user's hand from the right surface of the touch screen to the left surface thereof. If the left sweeping action is input, the control unit 130 performs an action such as an action corresponding to a "◄" button for converting the menu display in the left direction. The "right sweeping" refers to the movement of the user's hand from the left surface of the touch screen to the right surface thereof. If the right sweeping action is input, the control unit 130 performs an action such as an action corresponding to a "►" button for converting the menu display in the right direction.

As illustrated third in FIG. 5, "cover" refers a movement covering the whole touch screen. If the cover action is input over a specified time, the control unit 130 operates to finish the proximity UI mode and to turn off the screen of the display unit 120.

As illustrated fourth in FIG. 5, "space tap" refers a movement for a short time from upper to lower positions in the screen direction of the touch screen or a movement for a short time from lower to upper positions in the screen direction of the touch screen.

As illustrated fifth in FIG. 5, if the hover action is input, the control unit 130 performs a function of adjusting a volume of the portable device 100. For example, if the hover action slowly moving from upper to lower positions is input, the control unit 130 lowers the volume of the portable device 100. If the hover action slowly moving from lower to upper positions is input, the control unit 130 raises the volume of the portable device 100.

As described herein with reference to FIG. 5, various actions according to the proximity input correspond to operations such as menu display conversion, and selection, cancellation. However, these movement actions and corresponding operations are merely provided as examples, and various other actions according to the proximity input may be performed to correspond to the respective menus in accordance with embodiments of the present invention.

Specifically, if the motion is performed in a first direction, the control unit 130 selects the first menu and performs a function that corresponds to the first menu, and if the motion is performed in a second direction, the control unit 130 selects the second menu and performs a function that corresponds to the second menu. For example, if the left sweeping action is input, the control unit 130 selects a phone call menu to perform a call function, and if the right sweep action is input, the control unit 130 selects a photographing menu to perform a photographing function.

Next, for the proximity UI mode, the proximity UI mode screen displays a menu for a general function such as a phone call menu and a text menu provided by the portable device 100. In this case, the proximity UI mode screen can provide menus the number of which is smaller than the number of menus provided by the touch UI mode screen, because when the proximity UI mode, the input method is limited in comparison to the input method of the touch UI mode, and thus it is necessary to display menus for essential functions.

The proximity UI mode screen also provides the menu arrangement and menu size, which are different from those of the touch UI mode screen. For example, as illustrated in FIGS. 3B and 4D, the proximity UI mode screen may be larger than the menu that is provided on the touch UI mode screen. Further, on the proximity UI mode screen, menus are arranged only in the left and right directions, whereas on the touch UI mode screen, menus can be arranged in all directions, that is, in up, down, left, and right directions.

In addition to the touch UI mode and the proximity UI mode as described above with reference to FIGS. 3A to 5, the portable device can provide an acceleration UI mode and a rotation UI mode. Specifically, if the portable device 100 is shaken three times in a standby mode screen state, the control unit 130 releases the standby mode and provides the acceleration UI mode. In this case, the acceleration UI mode means a mode in which the acceleration input according to the acceleration sensor is sensed and the portable device 100 is controlled accordingly.

Further, if the portable device 100 is rotated three times in the left and right directions, based on the roll direction of the portable device 100 in the standby mode screen state, the control unit 130 releases the standby mode and provides the rotation UI mode. In this case, the rotation UI mode refers to a mode in which the rotation input according to the gyro sensor is sensed and the portable device 100 is controlled accordingly.

As described above, by providing diverse modes according to the type of the motion, the portable device 100 can be controlled even in the case where the capacitive touch screen is unable to be used due to climatic conditions or specified circumstances.

Referring back to the control unit 130 of FIG. 1, if a specified command is input in another UI mode except for the touch UI mode, the control unit 130 operates to convert the other UI mode into the touch UI mode. For example, if a touch UI mode conversion icon is selected in the proximity UI mode, the control unit 130 may operate to convert the proximity UI mode into the touch IO mode. Further, if a mode conversion button provided on the case of the portable device 100 is pressed, the control unit 130 may convert the proximity UI mode into the touch UI mode.

Figure 6:
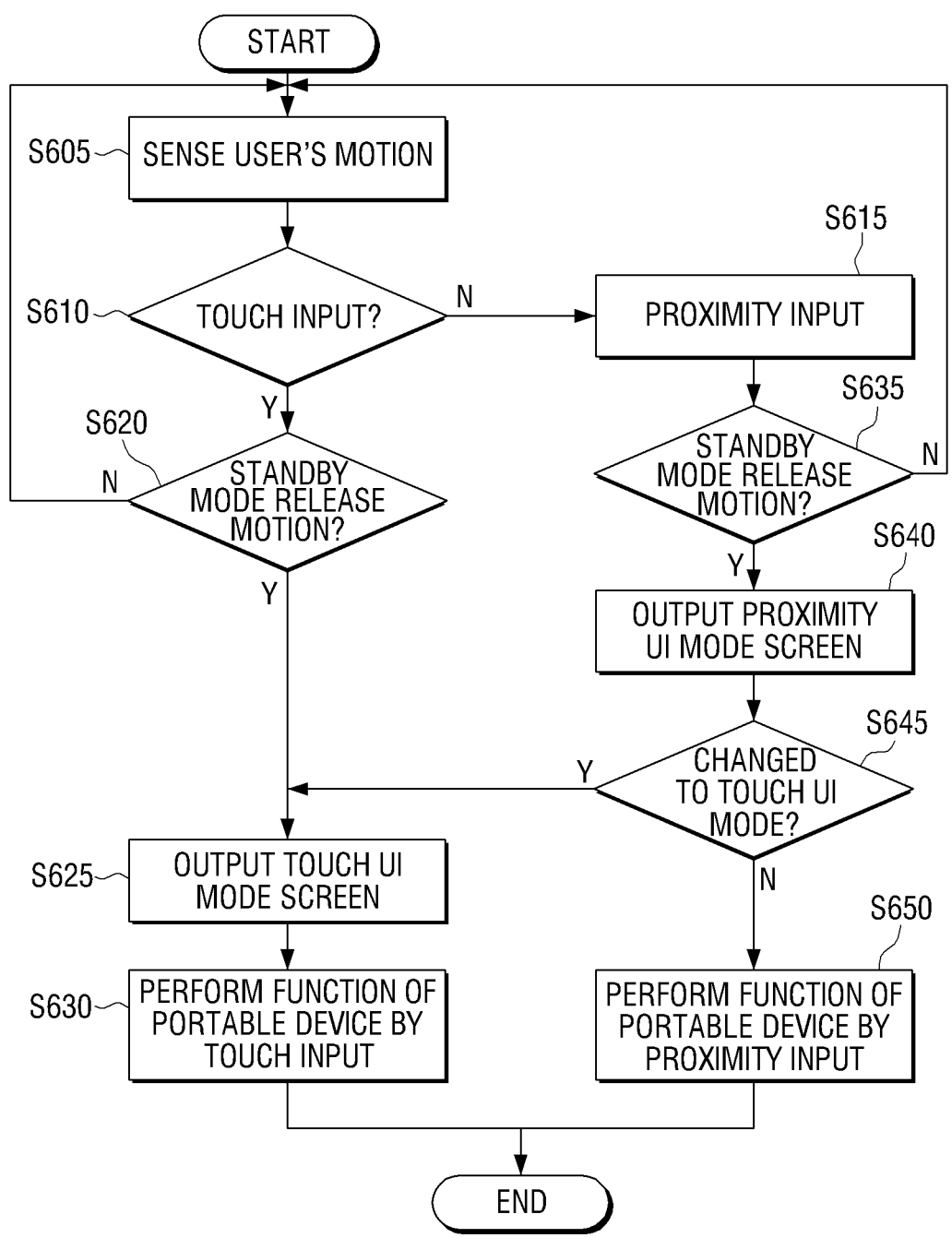
FIG. 6 is a flowchart illustrating a method of providing a UI mode of a portable device according to an embodiment of the present invention.

FIG. 6 is a flowchart illustrating a method of providing a UI mode of a portable device according to an embodiment of the present invention.

Referring to FIG. 6, a method of providing a UI mode of a portable device 100 is described as follows. First, the portable device 100 senses the user's motion using the sensor unit 110, in step S605. If the user's motion is sensed, the portable device 100 confirms whether the sensed motion is a touch input, in step S610. If the sensed motion is determined to be the touch input in step S610), the portable device 100 determines whether the input motion is a standby mode release motion, in step S620. Specifically, the portable device 100 determines whether the input motion is a motion that moves the icon 310 displayed on the touch screen, which corresponds to the standby mode release motion by the touch input, to the specified area.

If the motion input to the portable device 100 is determined to be the standby mode release motion by the touch input in step S620, the portable device outputs the touch UI mode screen, in step S625. Then, the portable device 100 converts the present mode into the touch UI mode, and performs the function of the portable device 100 according to the touch input, in step S630.

However, upon a determination that the motion input to the portable device 100 is not the touch input in step S610, and the proximity input is performed in step S615, the portable device 100 determines whether the input motion is the standby mode release motion according to the proximity input, in step S635. Specifically, the portable device 100 determines whether the input motion is a motion that including three round trips in the left and right directions while being spaced apart from the touch screen, which is defined as the standby mode release motion according to the proximity input.

If the motion input to the portable device 100 is determined to be the standby mode release motion according to the proximity input in step S635, the portable device 100 outputs the proximity UI mode screen in step S640. In this case, the number of proximity UI mode screens may be less than the number of menus that are displayed on the touch UI mode screen, and the size and arrangement of the proximity UI mode screen may be different from the size and arrangement of the menu that is displayed on the touch UI mode screen.

While the proximity UI mode screen is displayed, the portable device 100 determines whether there is an input for changing the present mode to the touch UI mode, in step S645. Specifically, the portable device 100 determines whether a touch UI mode change icon that is displayed on the proximity UI mode screen or a touch UI mode change button that is positioned on the outside of the case of the portable device 100, and determines whether to change the proximity UI mode to the touch UI mode.

At this time, if an input for changing the present mode to the touch UI mode is received in step S645, the portable device 100 outputs the touch UI mode screen in step S625, and perform the function of the portable device by the touch input in step S630.

However, if no input for changing the present mode to the touch UI mode is received in step S645, the portable device 100 performs the function of the portable device by the proximity input in step S650.

In the method according to FIG. 6, it is assumed that the portable device 100 provides the touch UI mode and the proximity UI mode. However, the portable device 100 may further provide other UI modes such as the acceleration UI mode and the rotation UI mode except for the touch UI mode and the proximity UI mode.

As described above, according to embodiments of the present invention, a portable device can be controlled even when the touch screen is unable to be used due to climatic conditions or other specified circumstances.

While the invention has been shown and described with reference to certain embodiments thereof, it will be understood by those skilled in the art that various changes in form and detail may be made therein without departing from the spirit and scope of the invention, as defined by the appended claims.

What is claimed is:
1. A portable device comprising:
   a display;
   a sensor configured to sense a user's gesture comprising one of a touch input where the display is touched and a proximity input where a motion is input over the display, without touching the display; and
   a processor configured to:
      identify a type of the sensed user's gesture, in response to the user's gesture being sensed by the sensor, identify whether the user's gesture is a standby mode release gesture, and in response to identifying the user's gesture is in the standby mode release gesture, release a standby mode of the portable device and output a touch User Interface (UI) mode screen that operates according to the touch input when the identified user's gesture is the touch input that moves an icon to a specified area on the display, and a proximity UI mode screen that operates according to the proximity input when the identified user's gesture is the proximity input for a predetermined threshold of time, wherein an arrangement and at least one of a size and a shape of a menu output according to the proximity UI mode screen is different from an arrangement and at least one of a size and a shape of a menu output according to the touch UI mode screen.

2. The portable device as claimed in claim 1, wherein the processor is further configured to output, in response to the sensed user's gesture being the touch input on a touch screen disposed on the display, the identified type of the sensed user's gesture as a touch input type and the UI mode screen as a touch UI mode screen, and in response to the sensed user's gesture being the proximity input sensed by a proximity sensor, the identified type of the sensed user's gesture as a proximity input type and the UI mode screen as a proximity UI mode screen.

3. The portable device as claimed in claim 2, wherein a number of menus output according to the proximity UI mode screen is less than a number of menus output according to the touch UI mode screen.

4. The portable device as claimed in claim 2, wherein the processor is further configured to convert, if a specified icon is selected in a proximity UI mode, the proximity UI mode screen into the touch UI mode screen to display the touch UI mode screen.

5. The portable device as claimed in claim 1, wherein the processor is further configured to output, if the sensed motion is an acceleration input caused by a change of acceleration of the portable device, an acceleration UI mode screen corresponding to the acceleration input.

6. The portable device as claimed in claim 1, wherein the processor is further configured to output, if the sensed motion is a rotation input caused by a rotation in at least one of a pitch direction, a roll direction, and a yaw direction, a rotation mode screen corresponding to the rotation input.

7. The portable device as claimed in claim 1, wherein the processor is further configured to perform at least one of a conversion, a selection, and a selection cancellation of a menu display that is displayed on the display according to a motion direction.

8. The portable device as claimed in claim 1, wherein the processor is further configured to select, if the sensed motion is performed in a first direction, a first menu to be displayed on the display, and selects, if the sensed motion is performed in a second direction, a second menu to be displayed on the display.

9. The portable device as claimed in claim 1, wherein the sensor includes at least one of an Infrared (IR) sensor, a Radio Frequency (RF) sensor, an acceleration sensor, a geomagnetic sensor, and a gyro sensor.

10. A method of providing a User Interface (UI) mode in a portable device, the method comprising:

identifying a type of a user's gesture sensed by a sensor;

in response to sensing the user's gesture, identifying whether the user's gesture is a standby mode release gesture, and in response to identifying that the user's gesture is the standby mode release gesture, releasing a standby mode of the portable device and outputting a touch User Interface (UI) mode screen that operates according to the touch input when the identified user's gesture is the touch input that moves an icon to a specified area on the display, and a proximity UI mode screen that operates according to the proximity input when the identified user's gesture is the proximity input for a predetermined threshold of time, wherein an arrangement and at least one of a size and a shape of a menu output according to the proximity UI mode screen is different from an arrangement and at least one of a size, and a shape of a menu output according to the touch UI mode screen.

11. The method as claimed in claim 10, further comprising:

in response to the user's gesture being a touch input, outputting the identified type of the user's gesture as a touch input type and the UI mode screen as a touch UI mode screen; and in response to the sensed user's gesture being a proximity input, outputting the identified type of the sensed user's gesture as a proximity input type and the UI mode screen as a proximity UI mode screen.

12. The method as claimed in claim 11, wherein a number of menus output according to the proximity UI mode screen is less than a number of menus output according to the touch UI mode screen.

13. The method as claimed in claim 11, further comprising converting, if a specified icon is selected in a proximity UI mode, the proximity UI mode screen into the touch UI mode screen to display the touch UI mode screen.

14. The method as claimed in claim 10, wherein outputting the UI mode screen includes outputting, if the motion is an acceleration input caused by a change of acceleration of the portable device, an acceleration UI mode screen corresponding to the acceleration input.

15. The method as claimed in claim 10, wherein outputting the UI mode screen includes outputting, if the motion is a rotation input caused by a rotation in at least one of a pitch direction, a roll direction, and a yaw direction, a rotation UI mode screen corresponding to the rotation input.

16. The method as claimed in claim 10, further comprising performing at least one of a conversion, a selection, and a selection cancellation of a menu display that is displayed on a display of the portable device according to a motion direction.

17. The method as claimed in claim 10, further comprising, if the sensed motion is performed in a first direction, selecting a first menu displayed on a display of the portable device, and selecting, if the sensed motion is performed in a second direction, a second menu displayed on the display of the portable device.

18. The method as claimed in claim 10, wherein the motion is sensed using at least one of an Infrared (IR) sensor, a Radio Frequency (RF) sensor, an acceleration sensor, a geomagnetic sensor, and a gyro sensor.

* * * * *